UNITED STATES PATENT OFFICE.

WILLIS H. POST, OF BATTLE CREEK, MICHIGAN, ASSIGNOR TO POSTUM CEREAL CO., LIMITED, OF BATTLE CREEK, MICHIGAN, A PARTNERSHIP.

BEVERAGE EXTRACT.

1,064,767.

Specification of Letters Patent.    Patented June 17, 1913.

No Drawing.    Application filed September 19, 1912. Serial No. 721,279.

*To all whom it may concern:*

Be it known that I, WILLIS H. POST, of Battle Creek, Michigan, have invented a new and useful Improvement in Beverage Extracts, which invention is fully set forth in the following specification.

This invention relates to beverage extracts and has for its object the production of a readily soluble extract from roasted figs and the preparation therefrom of a beverage which is palatable and possesses many of the desirable properties of this fruit.

The fleshy receptacle of *Ficus Carica* has long been known as an article of diet in its dried condition and has also been recognized in medicine for its nutritious, laxative and demulcent properties. Figs have also been roasted and mixed with coffee, the mixture being known as fig-coffee. In the preparation of a table beverage from roasted figs with or without admixture of coffee, skill not possessed by the average cook is required in its preparation in order to obtain quickly and in acceptable form a beverage having to the fullest extent the flavor and desirable properties characteristic of the roasted product.

I have discovered that a beverage extract may be prepared from roasted figs which overcomes the above objections and from which a beverage may be readily prepared by persons unskilled in the culinary art and which retains the desirable characteristics peculiar to that brewed from the roasted product.

By way of illustrating one way in which the benefits of my invention may be secured, dried figs are subjected to a regulated heat in suitable drying apparatus whereby the sugar content sometimes amounting to nearly 50% is caramelized. While the temperature may vary between comparatively wide limits, the best results are secured when slight carbonizing takes place. This insures complete caramelizing and develops desirable flavors in the product while facilitating the subsequent operation of extraction with water, either hot or cold, to remove soluble constituents in the form of a clear solution. From the roasted product a solid soluble extract is prepared by treating the product preferably in a comminuted form with water in which it may be steeped, boiled or soaked, but I prefer to make the extraction by percolation in water at about 50° to 60° C., thereby usually obtaining a clear solution. If a clear solution is not obtained filtration is resorted to for this purpose. The clear aqueous solution is next concentrated by evaporation to a solid. This operation is preferably conducted in a vacuum pan or on a rotary drum *in vacuo*, the usual precaution well-known to those skilled in this art being taken to prevent injurious heating of the product. The dried extract is then comminuted or reduced to grains, powder, flakes or other subdivided form and is ready for packing.

The resulting product is a beverage extract in comminuted form and of extreme solubility in water. A teaspoonful of the extract may be dissolved in a cup of hot water in one minute or less and produces a beverage having the pleasant flavor of the beverage made from the original roasted material and also retains certain of the characteristics of the dried figs.

What I claim is:—

1. A solid soluble extract for preparing beverages, consisting of extractive matter in soluble form of roasted figs.

2. A solid soluble extract for preparing beverages, consisting of extractive matter in soluble form of figs roasted to a degree sufficient to caramelize the sugar content.

3. A solid soluble extract for preparing beverages, consisting of soluble extractive matter in comminuted form derived from roasted figs.

4. A solid soluble extract for preparing beverages consisting of extractive matter in soluble form of partially carbonized figs.

In testimony whereof I have signed this specification in the presence of two subscribing witnesses.

WILLIS H. POST.

Witnesses:
  VERN D. SUTTON,
  G. M. LA PIERRE.